April 16, 1929.   F. B. COCKBURN   1,709,339

CLUTCH MECHANISM FOR LATHE APRON TRANSMISSION

Filed Dec. 27, 1927   2 Sheets-Sheet 1

Inventor
Francis B. Cockburn
By Wood & Wood
Attorneys

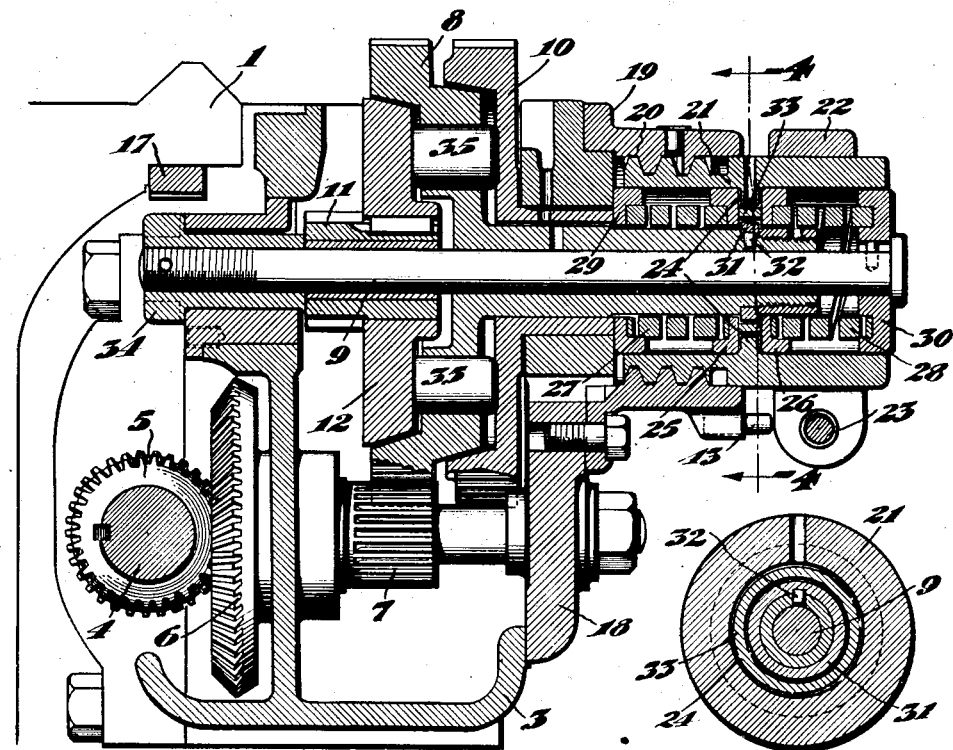
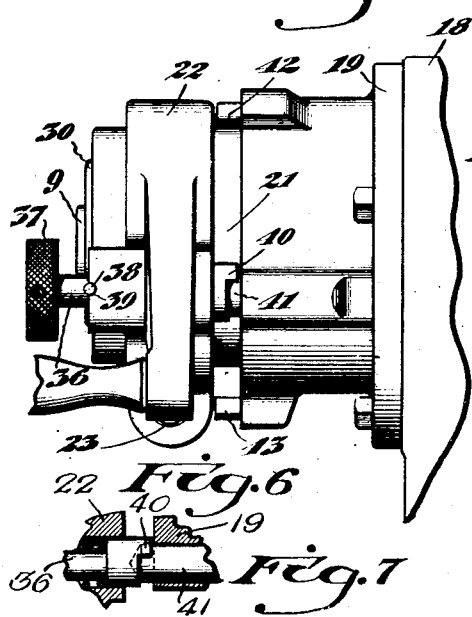
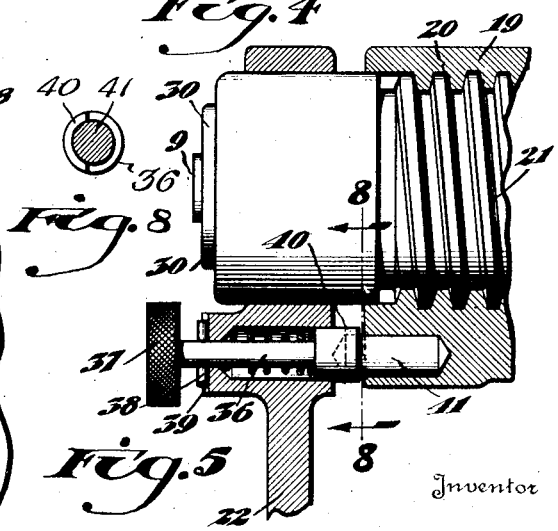

Patented Apr. 16, 1929.

1,709,339

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

CLUTCH MECHANISM FOR LATHE APRON TRANSMISSION.

Application filed December 27, 1927. Serial No. 242,806.

The invention relates primarily to a transmission control for apron feed on the bed of the lathe and the cross slide on the carriage.

For lathe apron traverse and cross feeds it has been the practice to move or connect a driving gear alternately with one of a pair of driven gears journalled coaxially with the driving gear. With the present invention, this relative arrangement is maintained, and the clutch members brought into coupling or uncoupling conditions under the pressure of a spring. With a dual type of clutches, a pair of springs are employed, in an opposed relation so that as one spring expands the other is compressed, with the force of the expanding spring moving one of the clutch members out of one clutching position into neutral or into a second or alternate clutching position.

The pressure exerted on the clutch members is not dependent on the effort of the operator and the pressure is of a capacity great enough to drive for the largest cut the machine is capable of carrying and the control is by easy movement of a single hand lever.

It is, therefore, an object of the invention to provide means whereby the control of a pair of opposing springs can be effected for compressing one and allowing the second to expand, with the expanding pressure utilized for connecting the members of a clutch and beyond the direct control of the operator. The control movement is free and easy adapting the use of springs of increasing expanding pressure which will engage the clutch members under greater pressure thereby obtaining greater driving power for the machine with greater ease in operation and increased durability.

Another object of the invention is to provide an actuator for alternately compressing and expanding a pair of opposing springs for friction clutch control, the actuator operated by a screw-thread feed of relatively coarse pitch so that upon a slight rotation of the actuator it will be moved longitudinally in an appropriate direction, compressing one of the springs and releasing the second or opposing spring, allowing the released spring to expand and its force to be transmitted for operating friction clutch members.

Other features and advantages of the improvement will be more fully set forth in the description of the accompanying drawings, in which.

Figures 1, 2:
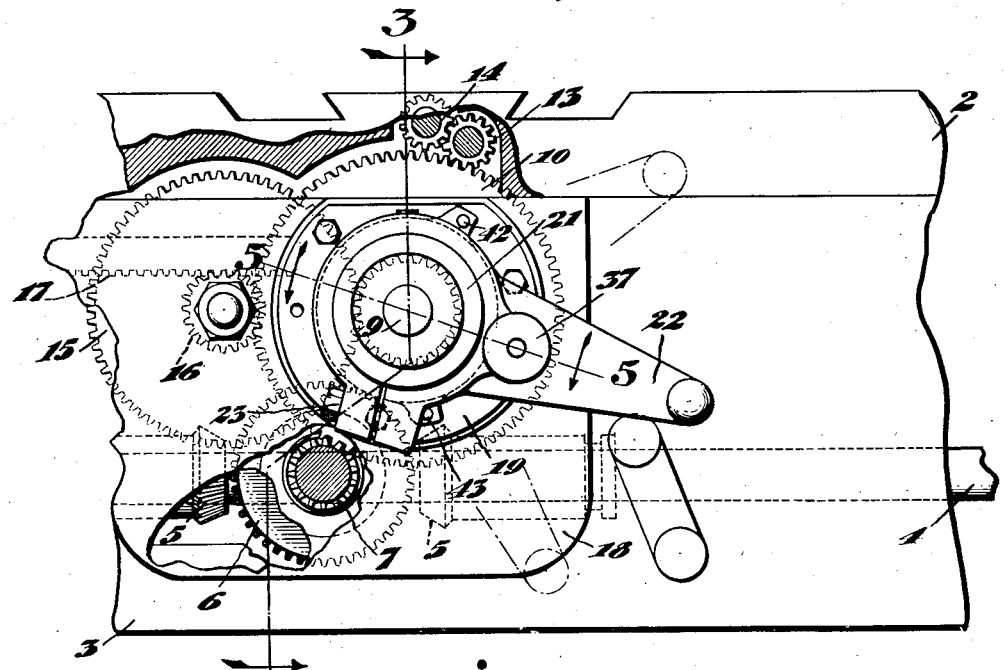
Figure 1 is a front elevation of a lathe carriage and apron provided with my improved mechanism, portions being broken away to disclose parts otherwise hidden.
Figure 2 is a top plan view of the apron with the top plate of the carriage from which the apron is suspended removed.

Figure 3 is a section on line 3—3, Figure 1.
Figure 4 is a section on line 4—4, Figure 3.
Figure 5 is a section on line 5—5, Figure 1.
Figure 6 is a side elevation of an extended casing fixed to the front face of the apron and the clutch operating sleeve carrying the hand lever for rotating the sleeve.

Figure 7 is a detail sectional view on the inner end of a detent carried by the operating handle.

Figure 8 is a section on line 8—8, Figure 5.

The invention is disclosed as a part of the transmission mechanism carried by the carriage apron of a lathe for feeding or translating the carriage upon the lathe bed or the tool slides in a cross feed upon the carriage, and in detail comprises an improvement upon a similar type of transmission mechanism shown and described in a patent issued to me, February 9, 1926, No. 1,572,107.

In general it comprises a plurality of adjacently disposed gears with an intermediate gear serving as a driver adapted to be alternately frictionally engaged with either of the pair of gears arranged at opposite sides of the driving gear, and mechanism mounted on the axis of the driving gear for moving the same axially for engaging the same alternately with said driven gears under spring pressure.

In the drawings, friction clutches of the cone type are disclosed, it, however, being recognized that other types may be utilized as, for instance, disks, as shown in said prior patent.

The device is adapted to be controlled by a single lever mounted on the end of a threaded sleeve concentrically disposed about the axis of the driving gear. The sleeve extends from the forward side of the lathe apron and is revolved by the hand lever, whereby through the action of the threads the sleeve is moved axially or longitudinally and thereby controls a pair of oppositely disposed springs which alternately move the driving gear under clutching pressure into frictional engagement with a selected driven gear.

Referring to the drawings, 1 indicates the lathe bed upon which the carriage 2 slides, the carriage being provided with a depending apron 3 and carries the transmission for feeding the carriage longitudinally upon the bed and for feeding the tool slide, slidably mounted upon the carriage. A power shaft 4 is journalled upon the bed and extends longitudinally thereof in rear of the apron, receiving its power from the head end of the lathe for transmitting the gearing carried by the lathe apron. This shaft is splined longitudinally and extends through and rotatively connects with bevel gear sleeves 5 journalled and slidable within suitable bearings carried by the lathe apron.

The gears of the sleeves are adapted to be alternately engaged with a bevel gear 6 journalled in the apron. The sleeves carrying the bevel gears may be shifted in any well known manner and utilized for forward or reverse motion to the apron transmission, the construction being common in the conventional engine lathe.

A pinion 7 rotatively connects with the bevel gear 6 and is in mesh with a gear 8 journalled upon a rod 9 mounted within the lathe apron. The gear 8 at its opposite sides is provided with cone friction surfaces for alternately and frictionally connecting with the gears 10 and 11 arranged respectively at opposite sides of the gear 8, the gear 8 at one side being provided with an external cone friction surface engaging into an internal cone friction surface in the gear 10, while the opposite side of the gear 8 has an internal cone friction surface engaging with a cone friction disk 12 which carries the gear 11.

The gear 8 being in mesh with the gear 7 revolves continuously while the machine is in operation. The gear 10 is in mesh with a pinion 13 which in turn meshes with a gear 14 on the end of the cross feed screw for the tool slide, the gear 10, therefore, being utilized for feeding the tool slide. The gear 11 is in mesh with a gear 15 which carries a pinion 16 in mesh with a rack 17 fixed to the lathe bed for translating the carriage upon the lathe bed. The gear trains for the tool slide and carriage feed follow the commercial standard generally used in engine lathes.

Under the arrangement shown for frictionally connecting the driving gear 8 alternately with the driven gears 10 and 11, the gear 11 through the friction disk 12, only one of the transmission trains can be clutched and in operation at a time as no utility is found for having the trains simultaneously connected, the alternate arrangement permitting of a simplified structure of control.

The driven gear 10 has a hub extending from one side thereof journalled in a bracket 18 bolted at one side of the apron and the gear 8 likewise is provided with a hub extension journalled in the hub of the gear 10 and extends through the same. A second bracket 19 is bolted to the bracket 18 and is provided with a hub or sleeve extension having a coarse pitch thread 20 on its inner periphery engaging with the external thread on the end of a sleeve 21 engaged into the hub of the bracket 19. The outer end of the sleeve 21 carries a lever 22 secured to the sleeve by means of a friction clamp and screw 23.

On the inner periphery of the sleeve 21 and approximately intermediate of its length an annular abutment 24 is formed which extends between a pair of opposing collars 25, 26 respectively forming seats for one end of the springs 27 and 28, the opposite ends of the springs seating into or engaging respectively with collars 29, 30, the collar 29 being engaged about the hub of the gear 8 and abuttingly bearing against the end of a boss on the bracket 18 while the collar 30 is fixed upon the end of the rod 9. The hub of the gear 8 carries the collar 31 fixed thereto by a pin 32, the collar likewise forming an annular abutment engaging between the spring seats or collars 25, 26.

A washer 33 is interposed between the collars 25, 26 and between the abutments and is of slightly greater width than the abutments to relieve the abutments of bearing contact with the collars 25, 26, when the clutch or gear 8 is in neutral position and also to clear one of the collars when the gear 8 is clutched to either one of the gears 10 or 11. The shaft 9 on its forward end is threaded to provide it with a nut 34 journalled in the apron, and likewise the shaft is journalled within the hub of the gear 8 and rotates with the gear 8 when the gear is clutched to gear 11. The gear 10 and friction disk 12 are definitely separated by a plurality of separators 35 constituting pins loosely engaged through the gear 8.

When the lever 22 is in an intermediate or neutral position, as shown in full lines Figure 1, the springs 27, 28 are opposing each other through the collar or washer 33. The opposing pressure of the springs when the lever 22 is in its intermediate position is balanced maintaining the gear 8 in an intermediate position between the gear 10 and friction disk 12 free from frictional engagement therewith and revolves independently. If the lever is moved upwardly the sleeve 21 is appropriately rotated and moves longitudinally in a direction to compress the spring 27, allowing spring 28 to expand transmitting its expanding pressure against the abutment 31 moving the gear 8 into engagement with the friction disk 12 and rotatively coupling the gears 8 and 11 for effecting the traverse of the carriage on the bed.

By depressing the lever an appropriate distance from its neutral position a reverse operation takes place, the sleeve being moved to compress the spring 28 and allow the spring 27 to expand shifting the gear 8 in its opposite direction into frictional engagement with gear 10 for feeding the slide on the carriage. The springs when expanded exert sufficient pressure to hold the clutched gears into engagement to the degree required. The tension of the springs can be regulated by drawing up or loosening the sleeve nut 34 on the end of shaft 9.

To provide a definite stop designating point for the hand lever at the neutral position and which will, without interference, enable the operator at will to freely swing the lever from the neutral to one clutch operating position and establish interference in passing the neutral position to an opposite clutching position, the lever 22 is provided with a spring pressed detent or plunger 36 slidable in a bore transversely in the hand lever, the detent having a knob 37 on its outer end for manually grasping to retract or rotate the same.

In the normal position of the detent it is locked against rotation by a pin 38 laterally engaged through the shank portion of the detent and seated in a groove 39 cut diametrically into the front face of a boss extruding from the hand lever at the point through which the detent projects. The head end of the detent is enlarged and provided with a segmental circular flange 40 to engage about one side of the stationary pin 41 projecting from the bracket 19. The segmental flange in the swing of the lever from one clutching position to neutral engages or abuts the pin, limits the movement of the lever, and centralizes the detent over the pin 41 to interlock therewith, holding the lever in its neutral position. To move the lever 22 to an opposite side of the pin, the detent is either retracted to clear the pin, or slightly retracted to disengage the pin 38 from the groove in face of the boss projecting from the lever 22 and rotated one-half revolution bringing the segmental flange 40 at an opposite side of the stop pin 41. The segmental flange 40 normally limits the throw of the hand lever to one side or the other of the stop pin 41, avoiding overthrow at the neutral position, adapting the operator to move the lever quickly and without precaution. The lever in shifting from one clutching position to unclutching position must come to a stop and the detent rotated before it is possible to throw the lever into the alternate or second clutching position unless the detent is manually withdrawn sufficiently to completely clear the stop pin.

Additional limit stops in the form of pins 42, 43 are provided for the lever 22 to limit its clutching throw at the opposite sides of the neutral stop pin, these pins outwardly projecting from the bracket 19 and adapted to be engaged by the detent 36 protruding from the underside of the lever.

When the lever 22 is in its intermediate or neutral position, as shown in Figure 1, the two opposing springs 27, 28 are in a counter-balanced position with the washer 33, as a spacer separating the springs, relieving the annular abutment 31 of the tension of the springs, the washer 33 being slightly wider than the annular abutment.

In such balanced position of the springs the gear 8 is in its intermediate or neutral position free to rotate without imparting motion to either of the driven gears. The movement of the springs to their neutral or counter-balanced position moves gear 8 to its neutral position, the gear thus being forcibly moved through the pressure of one of the springs expanding.

Turning the hand lever downwardly from its neutral position rotates the threaded sleeve 21 and moves the same longitudinally toward the bracket 18, compressing spring 27 and allowing the spring 28 to expand forcing the collar 26 into engagement with the annular abutment 31 of the gear sleeve, thereby forcing gear 8 into engagement with the friction disk 12. Moving the hand lever in a reverse direction from neutral compresses spring 28 while spring 27 expands moving the gear 8 into frictional engagement with gear 10.

In the structure shown, one set of springs provides for the alternate clutching of the gear 8 with either the friction disk or gear 10, allowing a neutral position with the pressure of the springs counter-balanced for sustaining the gear in its intermediate or unclutched position.

The particular arrangement, with the driving gear adapted to be alternately clutched with either one of a pair of driven gears makes it impossible to throw both driven gears into engagement which is of advantage in lathe apron feed or traverse.

Having described my invention, I claim:

1. In a transmission device of the class described, a pair of opposing clutch members adapted to be compressively frictionally coupled, a pair of springs opposingly related for moving one of said clutch members in alternate directions for clutching and unclutching, an actuator for said springs having a screw-thread feed for translating the same, and an element thereof interposed between said springs, whereby in the movement of said actuator one spring is compressed and the second allowed to expand, the force of the expanding spring moving said clutch member for either clutching or unclutching.

2. In a transmission device of the class described, a pair of opposing clutch members, a clutch member disposed intermediate of said opposing clutch members adapted to be compressively frictionally coupled to either of said opposing clutch members, a pair of springs opposingly related for moving said intermediate clutch member in alternate directions for clutching and unclutching, an actuator for said springs having a screw-threaded feed for translating the same, and an element thereof interposed between said springs, whereby in the movement of said actuator one spring is compressed and the second allowed to expand, the force of the expanding spring moving said intermediate clutch member, for either clutching or unclutching.

3. In a transmission device of the class described, a pair of opposing clutch members adapted to be compressively engaged for friction coupling, a pair of opposingly related springs coaxial with said clutch members for moving one thereof into a clutching or unclutching position and sustaining the clutch members compressively together under the expanding force of one of said springs, an annular abutment interposed between said springs carried by one of said clutch members for providing an operating connection between the springs and clutch members, an actuator having a screw-thread feed cooperating with said springs for alternately compressing one spring while allowing the second to expand with the expanding spring applying its force to said annular abutment and clutch member, and a crank handle for actuating said actuator.

4. In a device of the class described, comprising three transmission members adjacently coaxially disposed, the intermediate thereof movable in alternate directions for compressively engaging with either one or the other of said members, springs in opposing relation engaged with said movable transmission member for actuating the same and applying the compressive force for coupling connection, and a sleeve concentric about said springs having a screw-thread feed and engaged with said springs for alternately compressing one and allowing the other to expand, the expanding forces of the springs utilized for actuating said intermediate member.

In witness whereof, I hereunto subscribe my name.

FRANCIS B. COCKBURN.